(12) United States Patent
Yang et al.

(10) Patent No.: US 11,983,051 B2
(45) Date of Patent: May 14, 2024

(54) DETACHABLE MEMORY AND ELECTRONIC DEVICE HAVING THE DETACHABLE MEMORY

(71) Applicant: GETAC TECHNOLOGY CORPORATION, New Taipei (TW)

(72) Inventors: Jui-Lin Yang, Taipei (TW); Juei-Chi Chang, Taipei (TW)

(73) Assignee: Getac Technology Corporation, New Taipei (TW)

( * ) Notice: Subject to any disclaimer, the term of this patent is extended or adjusted under 35 U.S.C. 154(b) by 0 days.

(21) Appl. No.: 18/132,917

(22) Filed: Apr. 10, 2023

(65) Prior Publication Data

US 2023/0244282 A1 Aug. 3, 2023

Related U.S. Application Data

(63) Continuation of application No. 17/331,804, filed on May 27, 2021, now Pat. No. 11,662,783.

(Continued)

(30) Foreign Application Priority Data

Dec. 18, 2020 (CN) .......................... 202011501113.1

(51) Int. Cl.
*G06F 1/18* (2006.01)
*G06F 1/16* (2006.01)
(Continued)

(52) U.S. Cl.
CPC ............ *G06F 1/187* (2013.01); *G06F 1/1658* (2013.01); *G06F 1/185* (2013.01); *G06F 1/186* (2013.01); *G06F 1/203* (2013.01); *G06F 1/1632* (2013.01); *H01R 12/7076* (2013.01); *H01R 12/725* (2013.01); *H01R 13/64* (2013.01); *H01R 2201/06* (2013.01)

(58) Field of Classification Search
CPC .......... G06F 1/185; G06F 1/186; G06F 1/187; G06F 1/1632; G06F 1/1658; G06F 1/203
See application file for complete search history.

(56) References Cited

U.S. PATENT DOCUMENTS

| 5,107,400 | A | * | 4/1992 | Kobayashi | ............ | G06F 1/1616 |
| | | | | | | 200/50.01 |
| 5,124,887 | A | * | 6/1992 | Kobayashi | ............ | G06F 1/1656 |
| | | | | | | 361/679.57 |

(Continued)

FOREIGN PATENT DOCUMENTS

JP H11513190 A * 11/1999

*Primary Examiner* — Nidhi Thaker
(74) *Attorney, Agent, or Firm* — Cooper Legal Group, LLC

(57) ABSTRACT

An electronic device having a detachable memory is provided with a docking connector, and includes a device body and a memory. The device body has an accommodating slot and a stopping portion provided corresponding to the accommodating slot, and the stopping portion and the accommodating slot jointly form a displacement space in between. The memory is provided with a connector and a protruding stopped portion. When the memory is accommodated in the accommodating slot, the stopped portion is moved along into the displacement space and is stopped by the stopping portion, and the connector is docked with the docking connector. Thus, the memory is provided with an anti-misplugging effect.

14 Claims, 14 Drawing Sheets

Related U.S. Application Data

(60) Provisional application No. 63/044,137, filed on Jun. 25, 2020.

(51) Int. Cl.
  *G06F 1/20* (2006.01)
  *H01R 12/70* (2011.01)
  *H01R 12/72* (2011.01)
  *H01R 13/64* (2006.01)

(56) References Cited

U.S. PATENT DOCUMENTS

| | | | | |
|---|---|---|---|---|
| 5,305,180 | A * | 4/1994 | Mitchell | G06F 1/1656 361/728 |
| 5,786,984 | A * | 7/1998 | Bonardi | G06F 1/1654 361/679.55 |
| 6,176,724 | B1 * | 1/2001 | Klatt | H05K 5/0265 439/91 |
| 6,185,103 | B1 * | 2/2001 | Yamada | G11B 33/1493 |
| 6,731,500 | B2 * | 5/2004 | Allirot | G06F 1/181 361/679.34 |
| 6,985,355 | B2 * | 1/2006 | Allirot | G06F 1/181 361/728 |
| 8,164,896 | B1 * | 4/2012 | Wang | G11B 33/124 361/679.33 |
| 10,874,029 | B1 * | 12/2020 | Jian | H05K 7/20145 |
| 2006/0171109 | A1 * | 8/2006 | Chang | G06F 1/187 |
| 2011/0159718 | A1 * | 6/2011 | McKee | H01R 13/64 439/326 |
| 2022/0083105 | A1 * | 3/2022 | Furujiku | G06F 1/1616 |

* cited by examiner

DETACHABLE MEMORY AND ELECTRONIC DEVICE HAVING THE DETACHABLE MEMORY

CROSS-REFERENCE TO RELATED APPLICATIONS

This application is a continuation of U.S. application Ser. No. 17/331,804, filed May 27, 2021, which claims the benefit of U.S. provisional Patent Application No. 63/044,137, filed on Jun. 25, 2020, the are disclosure of which is hereby incorporated by reference herein in their entirety. The present application further claims priority to a CN Patent Application No. 202011501113.1, filed on Dec. 18, 2020, the disclosure of which is also hereby incorporated by reference herein in its entirety.

BACKGROUND OF THE INVENTION

Field of the Invention

The present invention relates to detachable assembly of a memory and, more particularly, to a detachable memory having an anti-misplugging function and an electronic device having the detachable memory.

Description of the Prior Art

An electronic device (e.g., a laptop computer or a tablet computer) is frequently required to connect to an additional memory by means of external connection. An electronic device is provided with an accommodating slot, and a memory is embedded in the accommodating slot and thus coupling is achieved by docking between the connector and the docking connector.

To assemble a current memory on an electronic device, one correct way for performing the assembly is first plugging one end of the memory in an inclined manner to one end of the accommodating slot, and the other end of the memory is then pressed into the other corresponding end of the accommodating slot. However, a user may often directly press the entire memory into the accommodating slot by way of embedding in a horizontal straight-up and straight-down manner without paying much attention. At this point in time, although the memory is in a misplugged state as being not entirely embedded in the accommodating slot, at least 90% of the volume of the memory is pressed into the accommodating slot, and so thorough coupling is achieved because a connector of the memory is fully docked with the docking connector of the electronic device, and the electronic device is yet capable of reading the memory in the misplugged state.

Even though a current memory in a misplugged state can be read by an electronic device, stable assembly between the misplugged memory and the electronic device cannot be maintained, such that the memory is often disengaged from the accommodating slot during use, causing a crash of the electronic device or even resulting in damage of data stored in the memory.

Looking into the issues above, one reason is that a current memory is almost entirely pressed into an accommodating slot although being misplugged, in a way that it may be difficult for a user to discover the misplugging; one other reason is that even if a current memory is misplugged, thorough coupling is still achieved and the memory is nonetheless read by an electronic device, also leading to a situation that a user has no way of knowing the current misplugging of the memory.

SUMMARY OF THE INVENTION

It is an object of the present invention to provide a detachable memory and an electronic device having the detachable memory which achieve an anti-misplugging effect by a stopping portion and a stopped portion.

To achieve the above object, the present invention provides an electronic device having a detachable memory. The electronic device is provided with a docking connector, and includes: a device body, having an accommodating slot and a stopping portion provided corresponding to the accommodating slot, the stopping portion and the accommodating slot jointly forming a displacement space in between; and a memory, provided with a protruding stopped portion and a connector. When the memory is accommodated in the accommodating slot, the stopped portion is moved along into the displacement space and is blocked by the stopping portion, and the connector is docked with the docking connector.

The present invention further provides a detachable memory configured to be fixed by a retaining structure, a fastening hole and a stopping portion. The detachable memory includes: a memory body, provided with a retaining notch into which the retaining structure is extended and being retained thereby; a stopped portion, protruding from the memory body, stopped by the stopping portion; and a fastener, protruding from the stopped portion, inserted in the fastening hole and is accordingly fastened.

Compared to the prior art, the present invention achieves an anti-misplugging effect.

It is another object of the present invention to provide an electronic device having a detachable memory. The electronic device is capable of inhibiting a connector from docking with a docking connector in the event of misplugging or preventing reading the memory in the event of incomplete docking, further allowing a user to become aware that the memory is currently misplugged and accordingly achieving an anti-misplugging effect.

To achieve the above object, the present invention further provides an electronic device having a detachable memory. The electronic device is provided with a docking connector, and includes: a device body, having an accommodating slot and a stopping portion arranged corresponding to the accommodating slot, the stopping portion and the accommodating slot jointly forming a displacement space in between; and a memory, provided with a protruding stopped portion and a connector. When the memory is to be accommodated in the accommodating slot, the memory is inclined as the stopped portion is stopped outside the displacement space and the accommodating slot by the stopping portion, further only achieving partial coupling for docking between the connector and the docking connector.

The present invention provides the following effects compared to the prior art. In the event of misplugging, a user is allowed to become aware that a memory is currently misplugged, further achieving an anti-misplugging effect.

DETAILED DESCRIPTION OF THE EMBODIMENTS

Details and technical contents of the present invention are given with the accompanying drawings below. However, the drawings are for purposes of reference and illustration and are not to be construed as limitations to the present invention.

Figure 1:
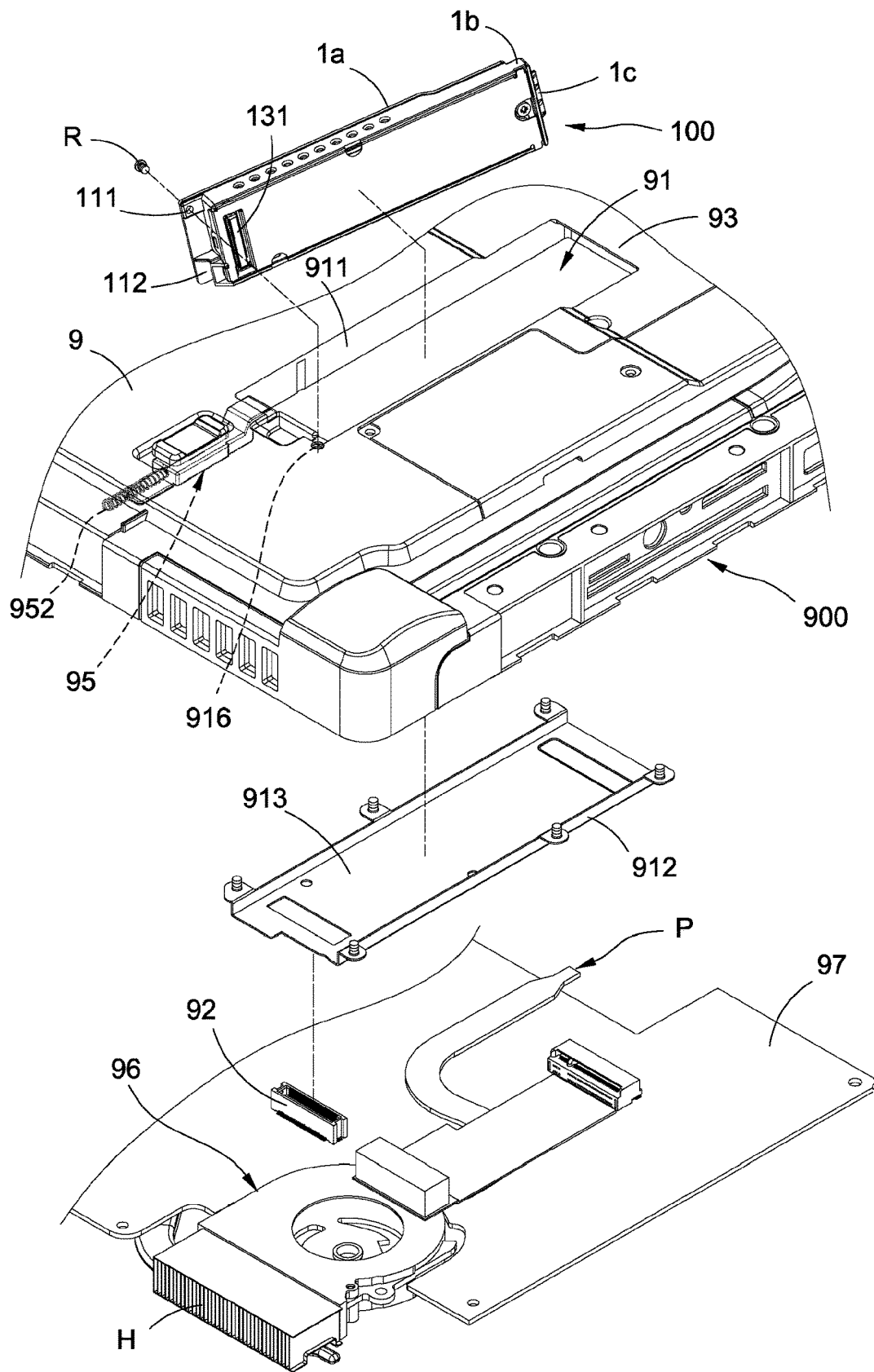
FIG. 1 is a partial exploded three-dimensional diagram of an electronic device in a top view according to a first embodiment of the present invention.

The present invention provides a detachable memory and an electronic device having the detachable memory. As shown in FIG. 1, an electronic device having a detachable memory (hereinafter referred to as an "electronic device") of the present invention may be any device connectable to various types of external detachable memories (hereinafter referred to as a "memory") 100, for example, a laptop computer or a tablet computer, such as a tablet computer shown in the drawing. An electronic device according to a first embodiment of the present invention includes a memory 100 and a device body 900. The memory 100 is detachably assembled to the exterior of the device body 900, and the two are electrically connected to each other when assembled. The memory 100 may be, for example but not limited to, a solid-state disk (SSD).

Figure 2:
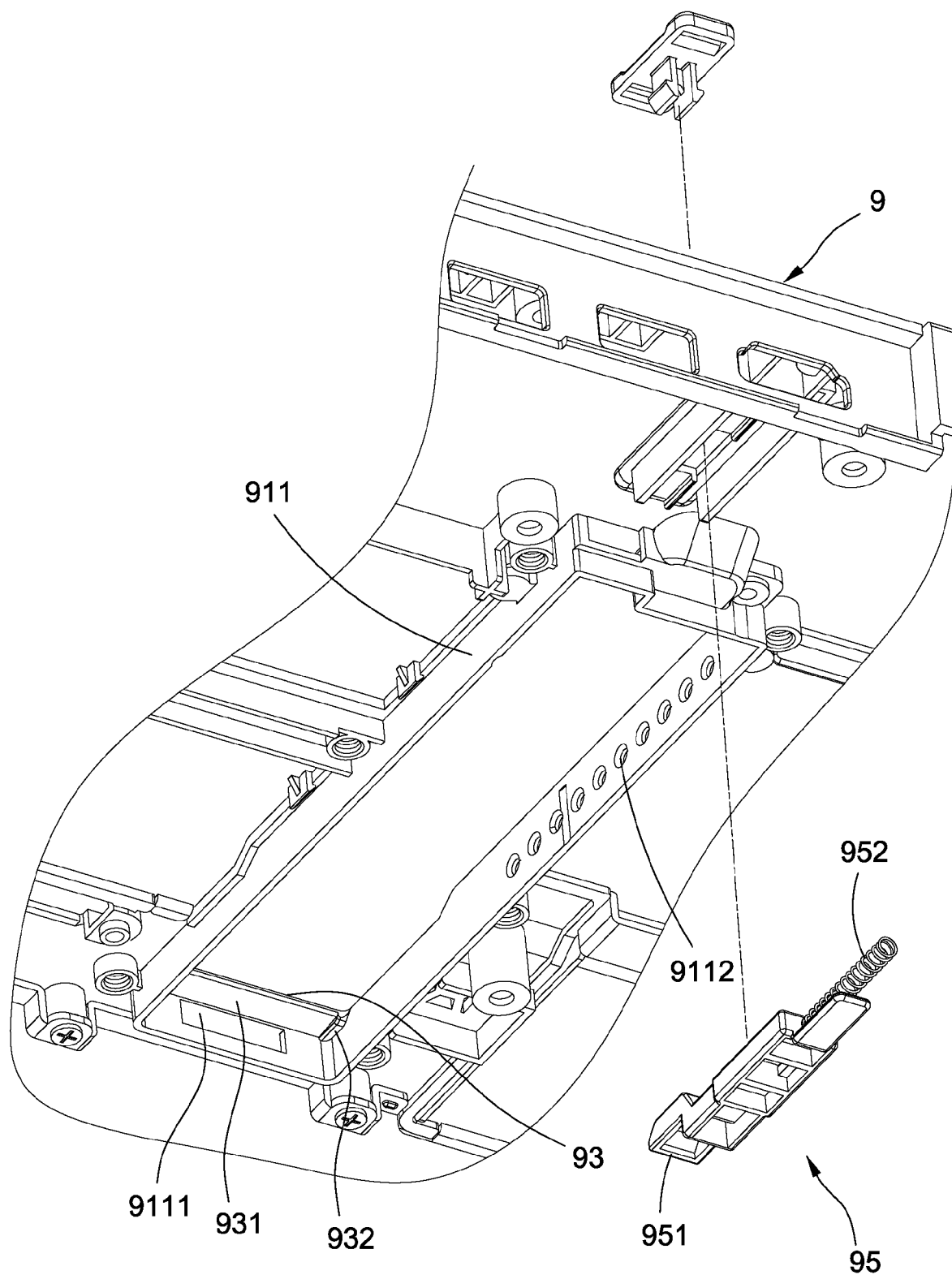
FIG. 2 is a partial three-dimensional diagram of a housing in FIG. 1 in a bottom view according to the present invention.
Figure 3:
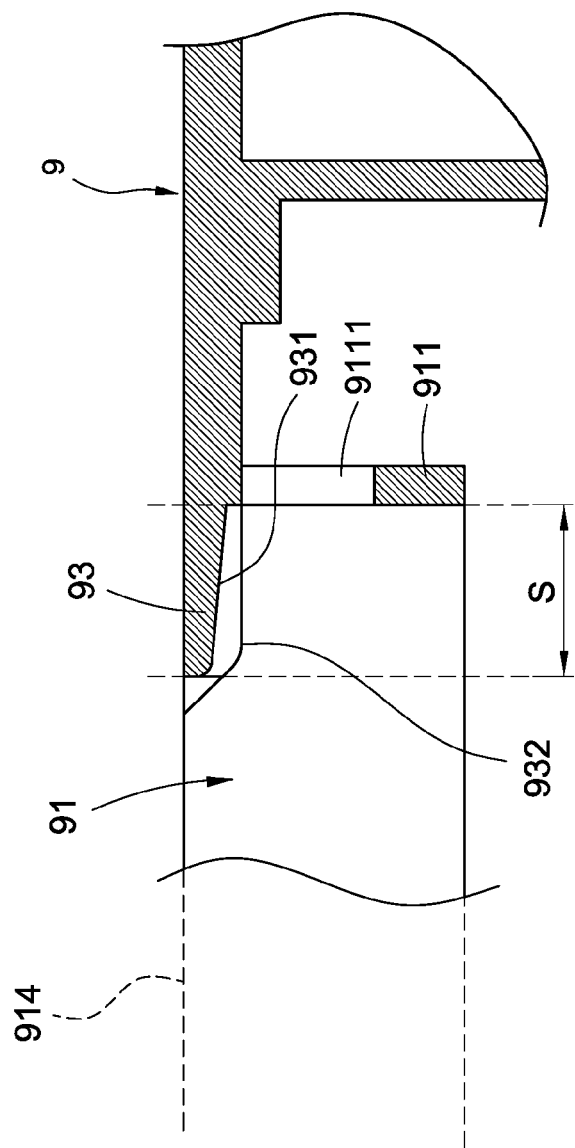
FIG. 3 is a partial cross-sectional diagram of FIG. 2 according to the present invention.
Figure 4:
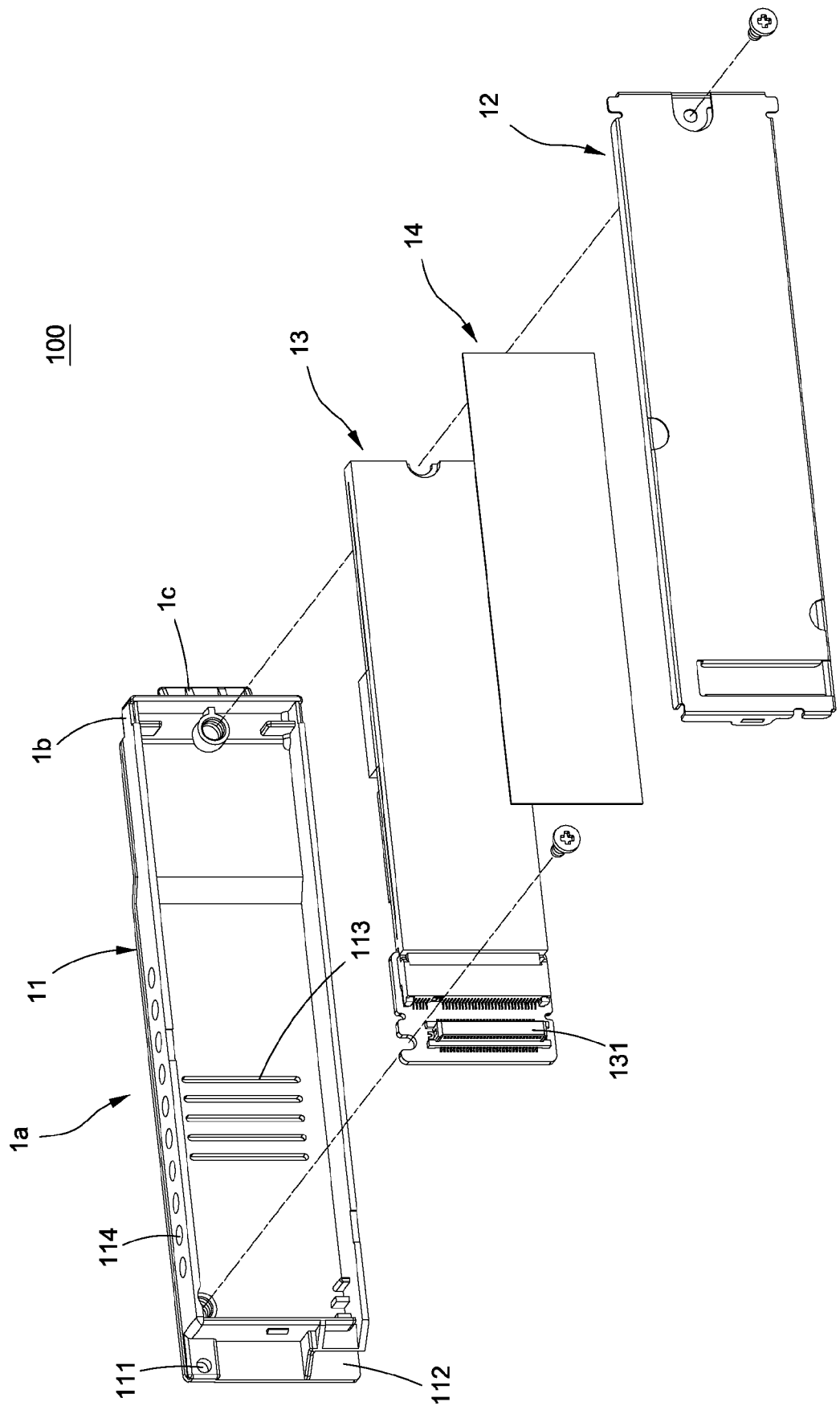
FIG. 4 is an exploded three-dimensional diagram of a memory according to the first embodiment of the present invention.

As shown in FIG. 1 to FIG. 3, the device body 900 is a body of the electronic device of the present invention, and has an accommodating slot 91, a docking connector 92 and a stopping portion 93, and further has a displacement space S formed therein.

Figure 7:
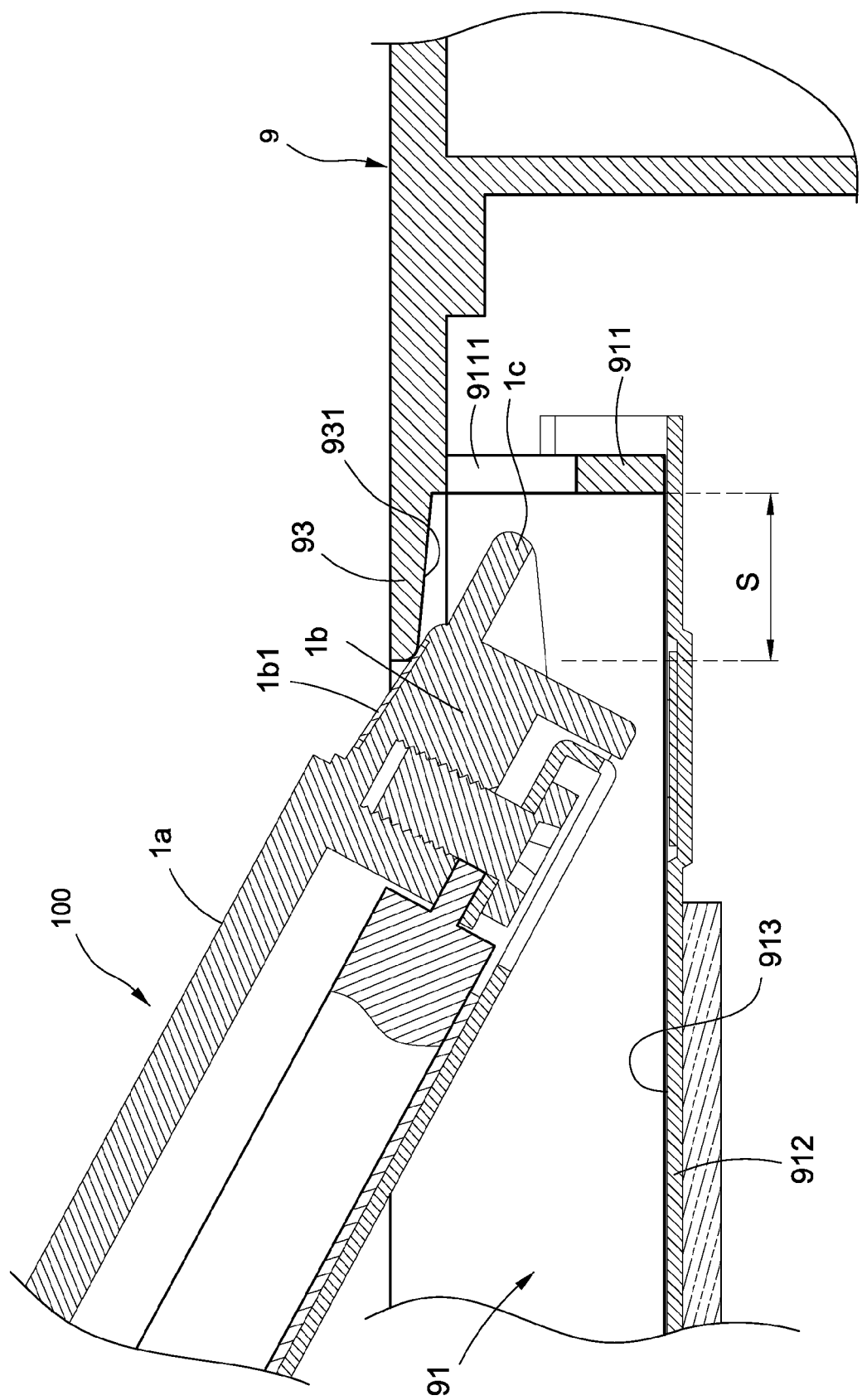
FIG. 7 and FIG. 8 are cross-sectional schematic diagrams of an electronic device during an assembly process of a memory according to the first embodiment of the present invention.
Figure 8:
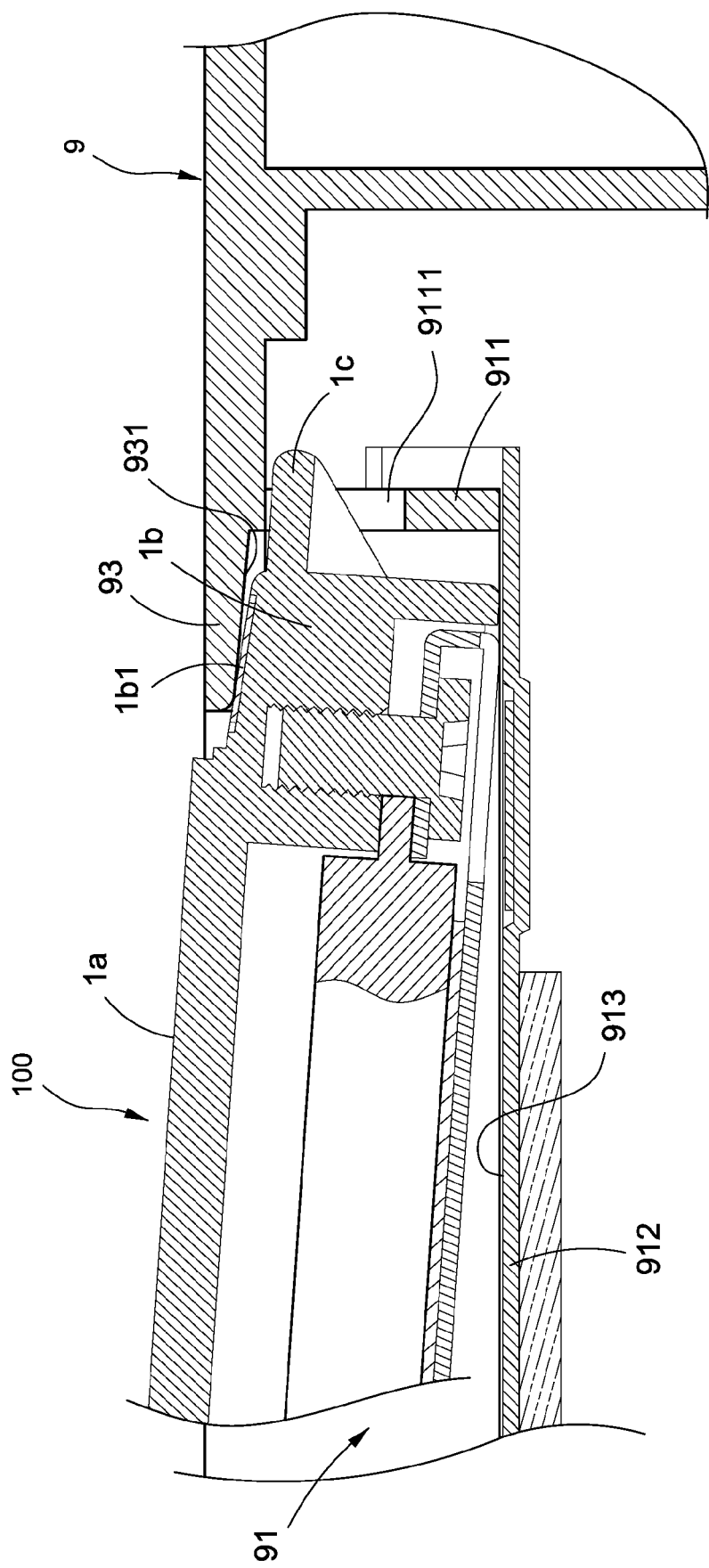

Specifically, the device body 900 includes a housing 9, and the accommodating slot 91 is recessed from one surface of the housing 9 so as to form on the housing 9 a recess starting point 914 as shown in FIG. 3 and a recess ending point (not denoted with a numeral, referring to a slot bottom surface 913 formed at the bottom of the accommodating slot 91 in FIG. 7, wherein the slot bottom surface 913 is equivalent to the recess ending point) as shown in FIG. 7, and preferably, a fastening hole 9111 is provided on a slot wall of the accommodating slot 91. The stopping portion 93 has a corresponding joining surface 931, and is located at a position of any desired height in front of the recess ending point of the accommodating slot 91. In this embodiment, the stopping portion 93 is located at the recess starting point 914 of the accommodating slot 91 as an example for illustration, so that the stopping portion 93 can partially block the accommodating slot 91 as shown in FIG. 3, and the stopping portion 93 and the accommodating slot 91 jointly form a displacement space S in between (as shown in FIG. 3). The housing 9 is provided therein with a device circuit board 97, and a docking connector 92 exposed in the accommodating slot 91 is provided on the device circuit board 97. It should be noted that, the docking connector 92 and the stopping portion 93 are respectively located on two opposite ends (which may be the left end and the right end shown in FIG. 1) of the accommodating slot 91.

Figure 5:
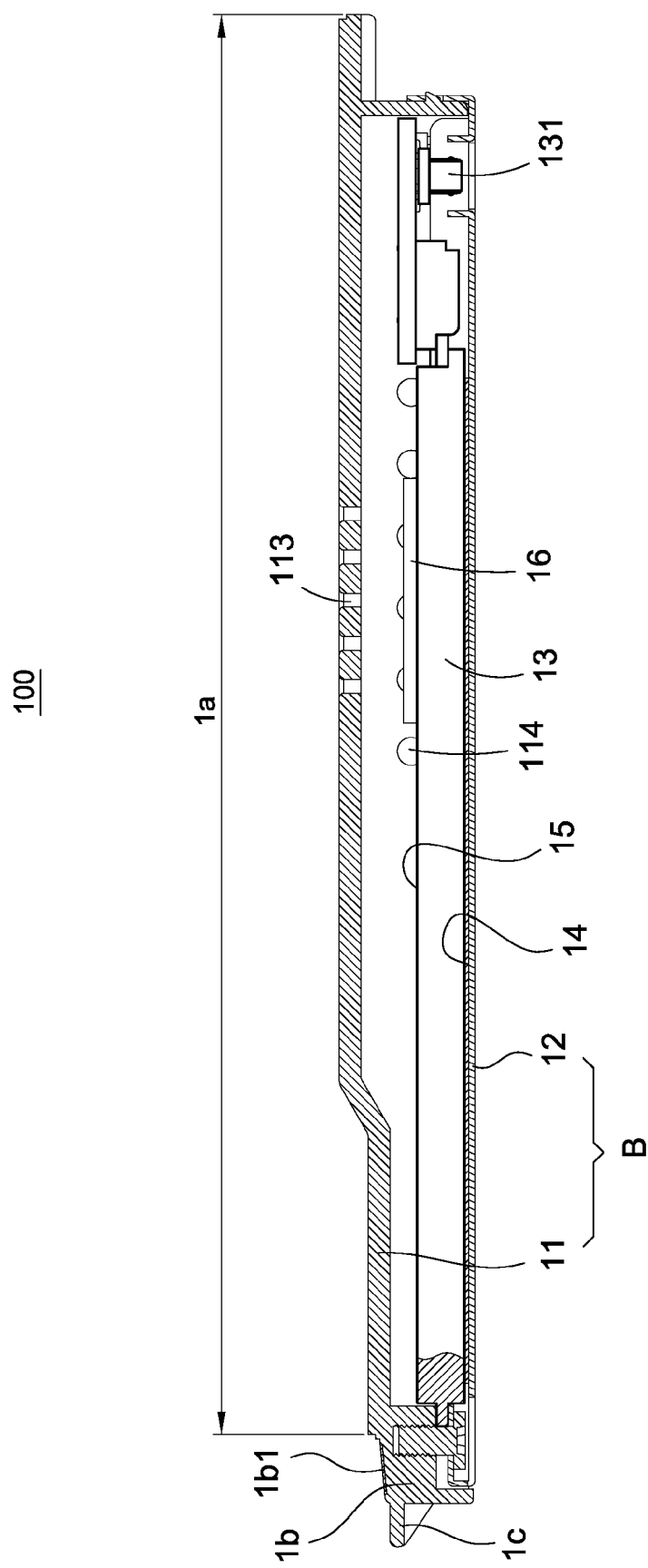
FIG. 5 is a cross-sectional diagram of a memory after assembly according to the first embodiment of the present invention.

As shown in FIG. 1 and FIG. 5, the memory 100 includes a memory body 1a and a stopped portion 1b, and preferably includes a fastener 1c. The memory body 1a is the body of the memory 100, and is provided with a connector 131. The stopped portion 1b protrudes from the memory body 1a and corresponds to the stopping portion 93. The stopped portion 1b has a joining surface 1b1, and the corresponding joining surface 931 corresponds to the joining surface 1b1. The fastener 1c protrudes from the stopped portion 1b and corresponds to the fastening hole 9111. The stopped portion 1b is connected between the memory body 1a and the fastener 1c.

Figure 9:
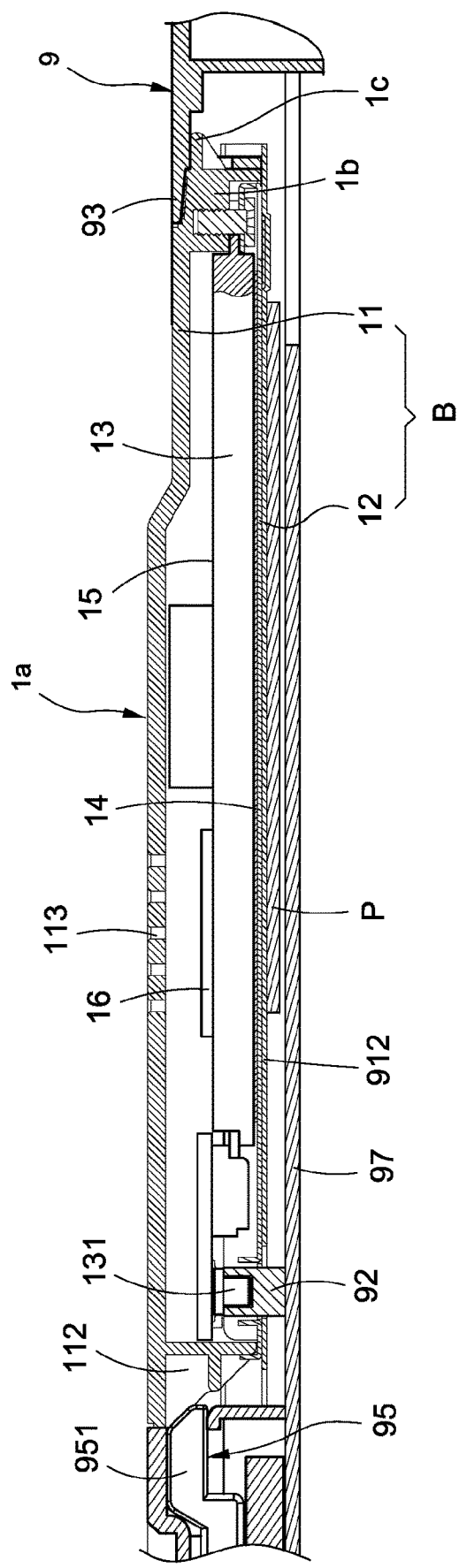
FIG. 9 is a cross-sectional schematic diagram of an electronic device after assembly of a memory according to the first embodiment of the present invention.
Figure 10:
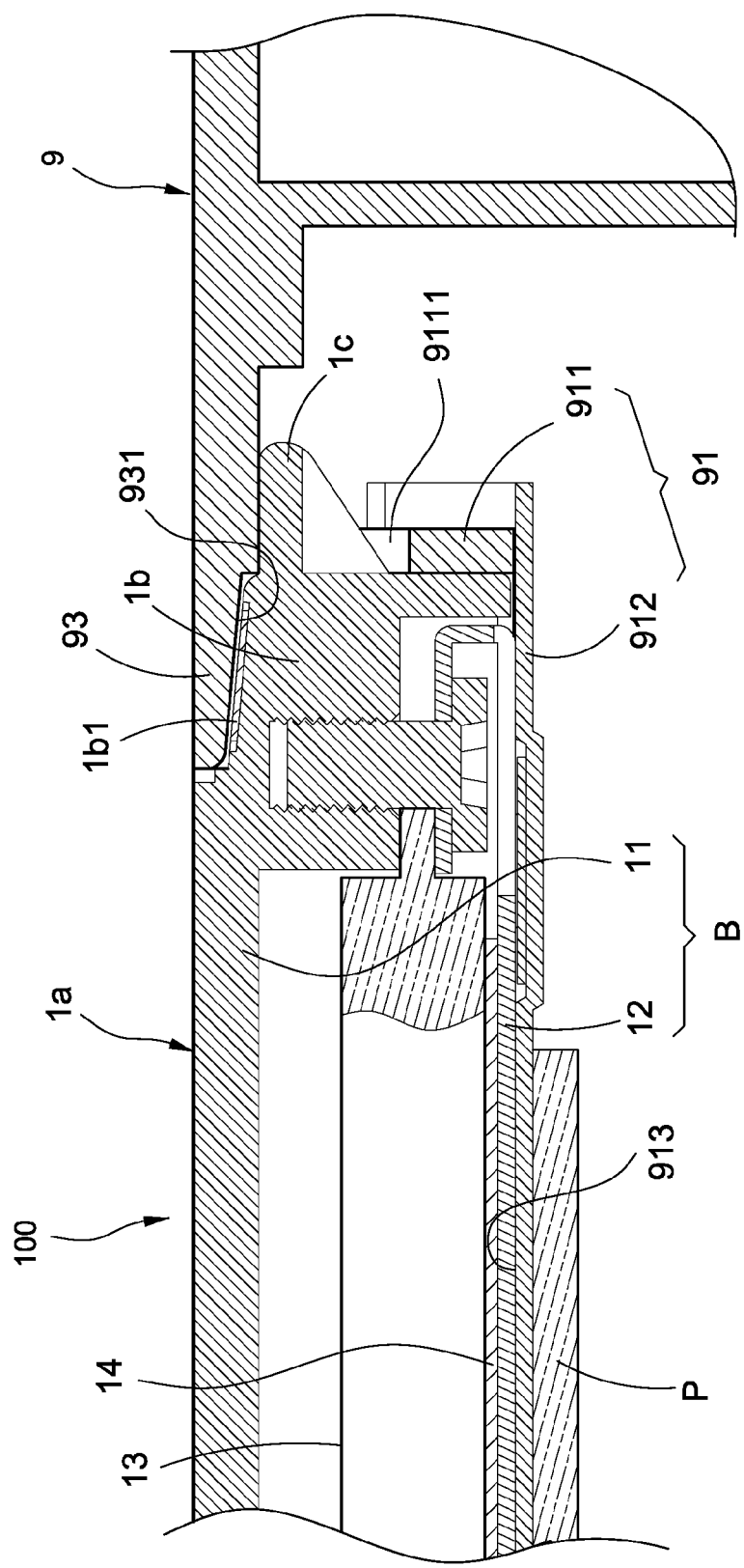
FIG. 10 is a partial enlarged diagram according to FIG. 9 of the present invention.

Thus, as shown in FIG. 5 and FIG. 7 to FIG. 10, when a user wishes to assemble the memory 100 in the accommodating slot 91, because the stopping portion 93 partially blocks the accommodating slot 91 such that the user is no longer able to embed the memory 100 in a horizontal straight-up and straight-down manner without paying much attention into the accommodating slot 91, one end of the memory 100 needs to be extended in an inclined manner into the displacement space S, in a way that the joining surface 1b1 of the stopped portion 1b becomes abutted against a front edge of the stopping portion 93. Meanwhile, the memory 100 rotates by using the front edge of the stopping portion 93 as a fulcrum, so that the stopped portion 1b can move relative to the stopping portion 93 during the rotation and further move along and enter the displacement space S. Once the stopped portion 1b is moved into the displacement space S, as shown in FIG. 9 and FIG. 10, the stopped portion 1b is stopped by the stopping portion 93, and the connector 131 is fully docked with the docking connector 92 so that the two become thoroughly coupled to each other (meaning that connection terminals of the two are completely coupled), and preferably, the fastener 1c is inserted in the corresponding fastening hole 9111 and is thus fastened.

In brief, with the partial blocking the stopping portion 93, a user is no longer able to embed the memory 100 in a horizontal straight-up and straight-down manner without paying much attention into the accommodating slot 91, and is instead forced to perform assembly in a correct manner; that is, one end of the memory 100 having the stopped portion 1b is first extended into the displacement space S, and the other end of the memory 100 is pressed into the accommodating slot 91, such that the connector 131 becomes fully docked with the docking connector 92. Thus, the memory 100 of the present invention can prevent forced assembly in an incorrect manner to the device body 900.

Figure 6:
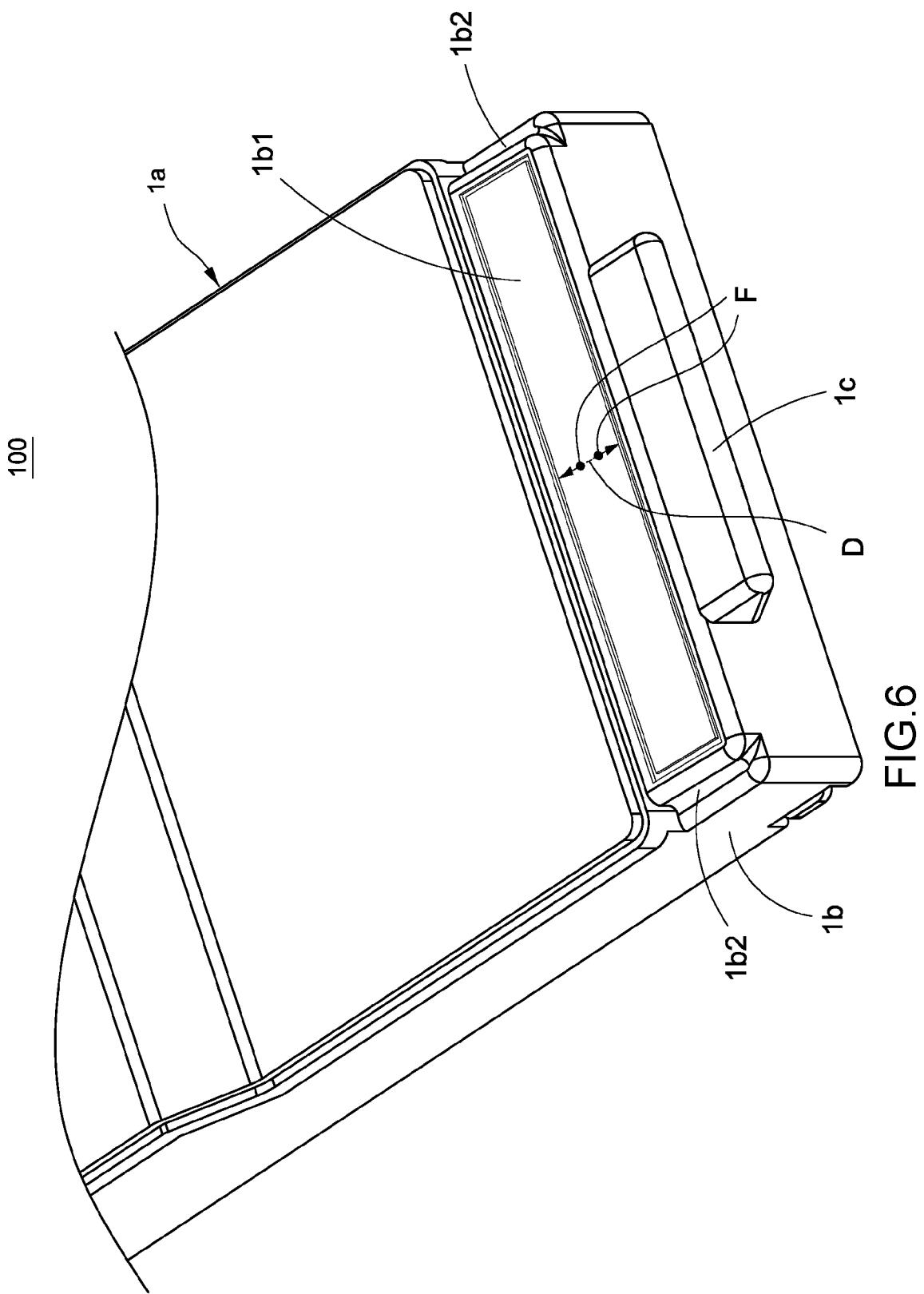
FIG. 6 is a partial three-dimensional diagram of a memory after assembly according to the first embodiment of the present invention.

It should be noted that, as shown in FIG. 6 to FIG. 9, the stopped portion 1b produces, by moving relative to the stopping portion 93 while rotating, a movement path D on the joining surface 1b1 thereof as shown in FIG. 6, and the joining surface 1b1 is defined with a plurality of floating rotating shafts F along the movement path D, so that the stopped portion 1b can be abutted against the front edge of the stopping portion 93 using these floating rotating shafts F, further enabling the memory 100 to rotate respectively according to these floating rotating shafts F.

To provide the movement process of the stopped portion 1b into the displacement space S with a guiding effect, as shown in FIG. 2, FIG. 3 and FIG. 6, each of two opposite sides of the joining surface 1b1 of the stopped portion 1b is provided with a guiding groove 1b2 parallel to the movement path D, the corresponding joining surface 931 of the stopping portion 93 is provided with two guiding ribs 932 corresponding to the guiding grooves 1b2, and the guiding grooves 1b2 are inserted by the guiding ribs 932 and hence guided by the guiding ribs 932.

In order to be more easily assemble and detach the memory 100, as shown in FIG. 7 to FIG. 10, the joining surface 1b1 of the stopped portion 1b may further incline from high to low in a direction from the memory body 1a toward the fastener 1c, and the corresponding joining surface 931 of the stopping portion 93 may have a slope corresponding to the slope of the joining surface 1b1. Thus, taking an assembly process for example, the assembly is looser in an initial stage of the process, and becomes tighter as progressing to a later stage.

Figure 11:
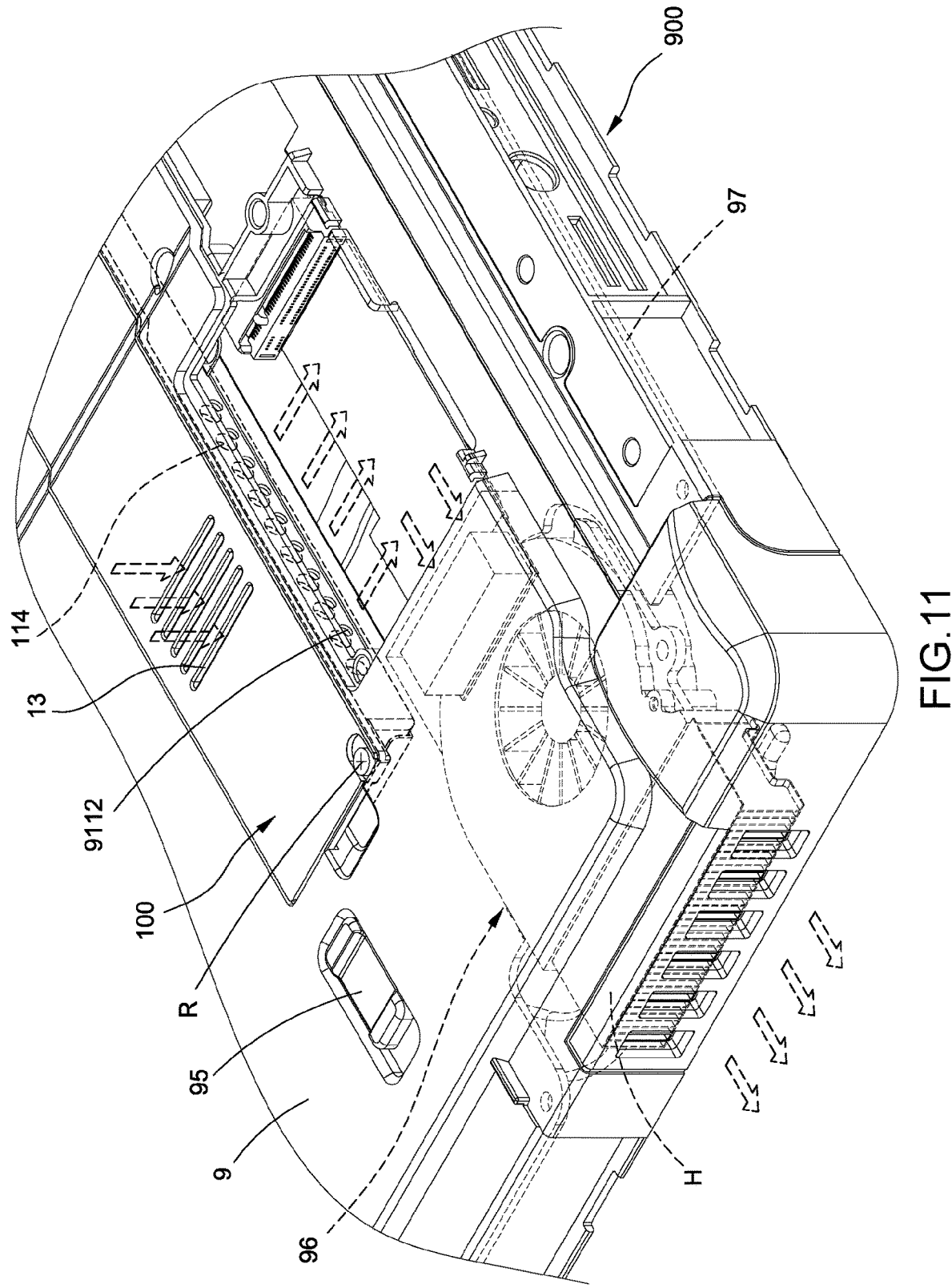
FIG. 11 is a partial three-dimensional schematic diagram of assembly of an electronic device according to the first embodiment of the present invention.

In order to securely fix the memory 100 on the device body 900, as shown in FIG. 1 and FIG. 11, the memory 100 may be provided with a first fixing portion 111 on the memory body 1a, and the device body 900 may be provided with a second fixing portion 916 (for example, the second fixing portion 916 may be provided on the housing 9). When the memory 100 is assembled in the accommodating slot 91, the first fixing portion 111 and the second fixing portion 916 correspond to each other, and at this point in time, a fixing element R is detachably fixed at the first fixing portion 111 and the second fixing portion 916 so as to achieve an effect of securely fixing the memory 100 on the device body 900.

It should be noted that, as shown in FIG. 1, FIG. 2 and FIG. 9, the device body 900 may further include a retaining structure 95. The retaining structure 95 is provided with a retainer 951 extended into the accommodating slot 91, and an elastic element 952 elastically supporting between the retaining structure 95 and the housing 9. The memory 100 is provided with a retaining notch 112 at the memory body 1a. Thus, when the memory 100 is assembled in the accommodating slot 91, the retainer 951 can extend into the retaining notch 112 and retain the memory 100 (a shown in FIG. 13); when the user twitches the retaining structure 95, the retainer 951 is withdrawn from the retaining notch 112 to release the retainment.

Figure 12:
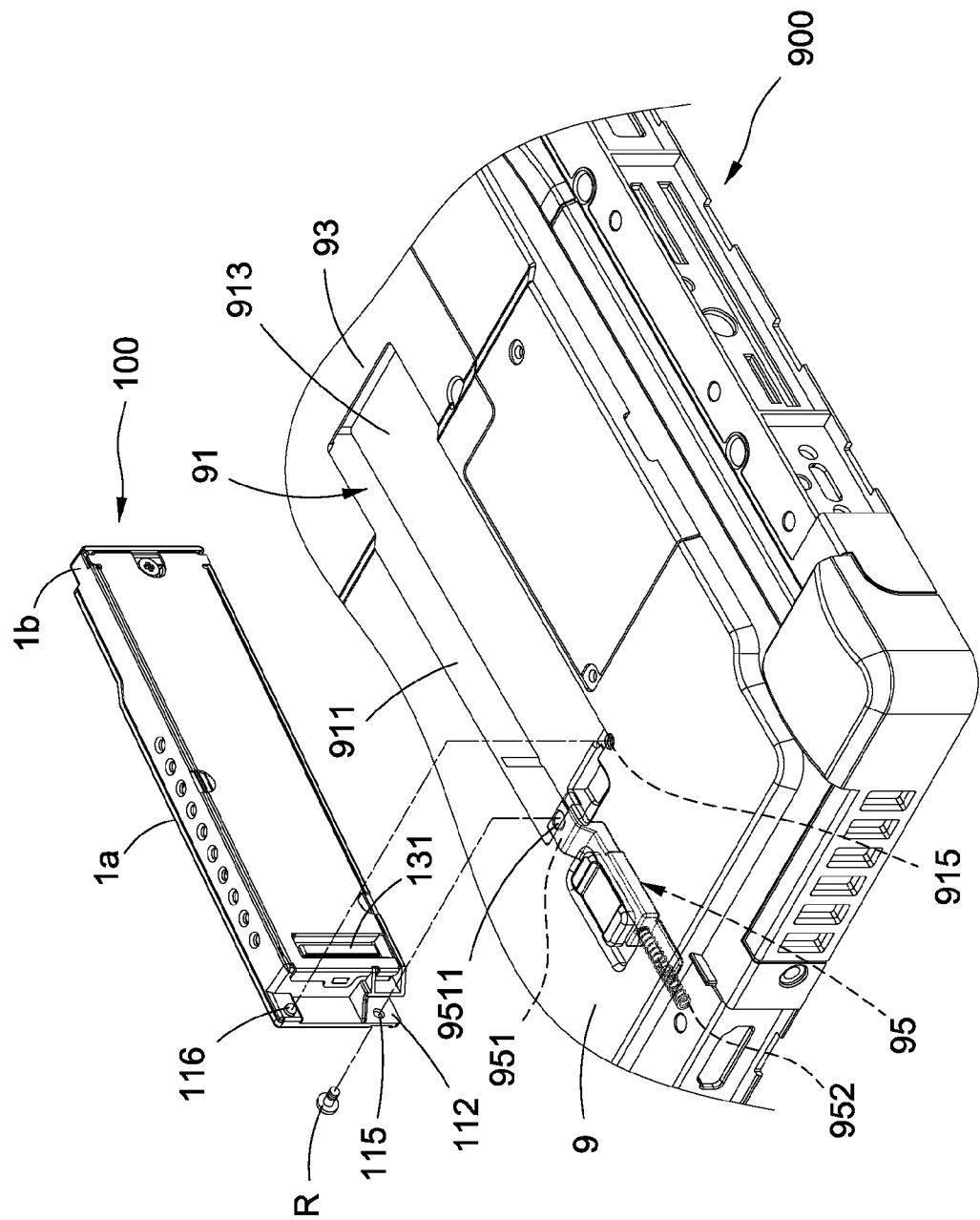
FIG. 12 is a partial exploded three-dimensional diagram of an electronic device before assembly according to a second embodiment of the present invention.
Figure 13:
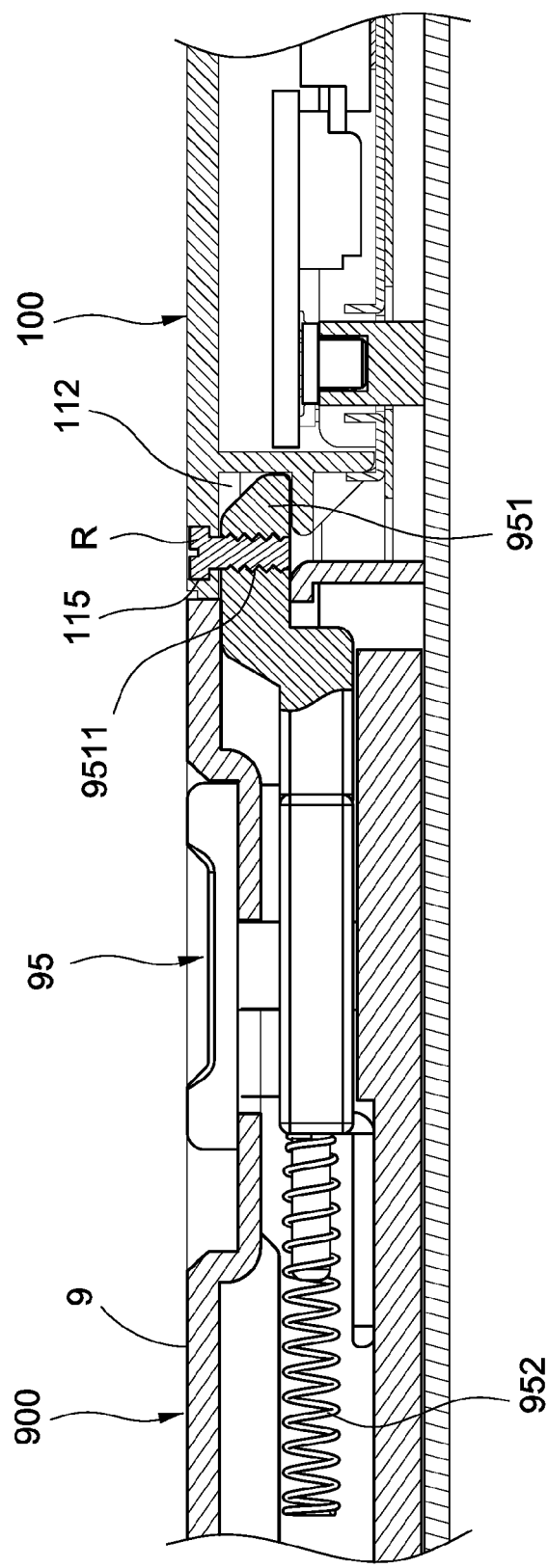
FIG. 13 is a partial cross-sectional schematic diagram after assembly according to FIG. 12 of the present invention.

In FIG. 12 and FIG. 13 showing an electronic device according to a second embodiment of the present invention, the second embodiment is substantially the same as the first embodiment, and differs only in that the first fixing portion 115 and the second fixing portion 9511 are arranged at different positions.

The first fixing portion 115 is changed to being provided corresponding to the retaining notch 112, and the second fixing portion 9511 is changed to being provided at the fastener 951. Thus, when the memory 100 is assembled in the accommodating slot 91 and the fastener 951 is extended into the retaining notch 112, the first fixing portion 115 and the second fixing portion 9511 correspond to each other, and the fixing element R can be detachably fixed to the first fixing portion 115 and the second fixing portion 9511, so that the retainer 951 achieves both effects of retaining and securely fixing the memory 100.

Preferably, the memory 100 may be further provided with a positioner 116 at the memory body 1a, and a positioning portion 915 corresponding to the positioner 116 is provided in the accommodating slot 91 of the housing 9. The structures of the positioner 116 and the positioning portion 915 are not specifically defined in the present invention, and are exemplified by a protruding pin and a recessed hole in this embodiment for illustration. Thus, when the memory 100 is assembled in the accommodating slot 91, the positioner 116 is moved along and inserted into the positioning portion 915, so as to position the memory 100 in the accommodating slot 91.

As shown in FIG. 1, FIG. 2, FIG. 4, FIG. 5, FIG. 9 and FIG. 11, the foregoing embodiments of the present invention may further provide heat conduction and heat dissipation effects, with the associated details given below.

The housing 9 of the device body 900 is provided with an encircling wall 911 and a first heat conductive carrier plate 912 having good heat conductivity. The first heat conductive carrier plate 912 seals a lower opening of the encircling wall 911 such that the encircling wall 911 and the first heat conductive carrier plate 912 form in an encircling manner the foregoing accommodating slot 91, and the first heat conductive carrier plate 912 is provided with the foregoing slot bottom surface 913 serving as the bottom of the accommodating slot 91. The encircling wall 911 is provided with the foregoing fastening hole 9111, and preferably further provided with a plurality of ventilation holes 9112, wherein the ventilation holes 9112 are in communication with the interior of the device body 900.

In the memory 100, the memory body 1a includes a memory circuit board 13 and a second heat conductive carrier plate 12 having good heat conductivity, and preferably includes a cover 11 and a heat conductive pad 14. The cover 11 is combined with the second heat conductive carrier plate 12 to jointly form a box B, and the memory circuit board 13 is provided in the box B and is provided with the foregoing connector 131 exposed from the box B. The heat conductive pad 14 is overlappingly connected between one surface of the memory circuit board 13 and one surface of the second heat conductive carrier plate 12. It should be noted that, the foregoing stopped portion 1b is formed on one end of the cover 11, the foregoing fastener 1c is provided at the stopped portion 1b, and the first fixing portion 111 and the retaining notch 112 of the first embodiment (or the first fixing portion 115, the retaining notch 112 and the positioner 116 of the second embodiment) are provided on the other end of the cover 11. The cover 11 may preferably be provided with a plurality of air inlets 113 and a plurality of air outlets 114, and the air inlets 113 and the air outlets 114 are respectively located on a top surface and a side of the cover 11, so that the air outlets 114 located on the side can be in communication with the ventilation holes 9112 as shown in FIG. 11.

Thus, heat generated by electronic heat emitting elements (not shown) on the memory circuit board 13 can be transferred through the heat conductive pad 14 and the second heat conductive carrier plate 12 to the first heat conductive carrier plate 912, and be quickly transferred through a heat conductive structure P (referring to FIG. 1 and FIG. 9) adhered to the first heat conductive carrier plate 912 to a heat dissipation structure (as a heat dissipator H and a fan 96 shown in FIG. 1) provided in the device body 900 for heat dissipation. Furthermore, as shown in FIG. 5 and FIG. 11, in the electronic device of the present invention, an airflow path (as directions of the arrows in FIG. 11) is formed jointly by the fan 96, and the ventilation holes 9112, the air outlets 114 and the air inlets 113 in communication with the fan 96, so that external air is drawn through the ventilation holes 9112, the air outlets 114 and the air inlets 113 by the fan 96 and further flows through the electronic heat emitting elements on the memory circuit board 13 to achieve an air-cooled heat dissipation effect.

The memory body 1a may further include an aluminum foil 15 and at least one anti-electrostatic discharge (ESD) adhesive 16. The aluminum foil 15 can be adhered to the other surface of the memory circuit board 13, and an anti-electromagnetic interference (EMI) coating (not shown) may be applied on both of the aluminum foil 15 and the second heat conductive carrier plate 12, so as to provide both heating uniformity and anti-EMI effects. The aluminum foil 15 may be further adhered with at least one anti-ESD adhesive 16, and any one of the at least one anti-ESD adhesive 16 corresponds to the air inlets 113 as shown in FIG. 9, so as to further provide an anti-ESD effect.

Figure 14:
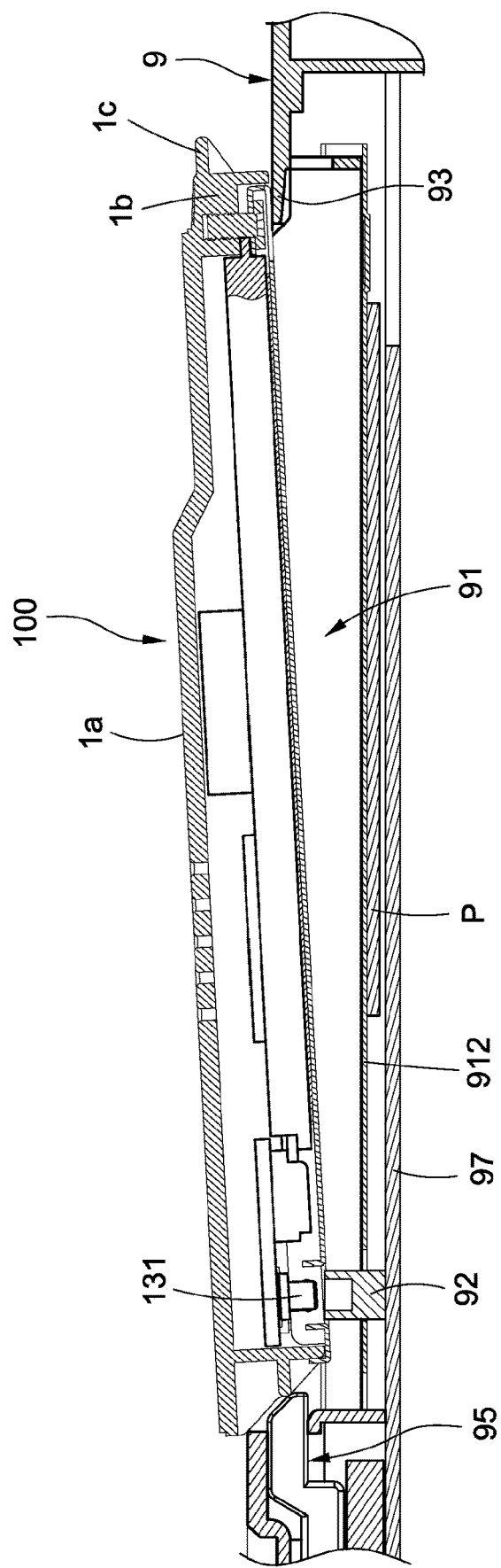
FIG. 14 is a cross-sectional schematic diagram of an electronic device when a memory is misplugged according to the present invention.

FIG. 14 shows a schematic diagram of the embodiments of the present invention when the memory 100 is misplugged. By partially blocking the accommodating slot 91 with the stopping portion 93, even if the user embeds the memory 100 in a horizontal straight-up and straight-down manner without paying much attention into the accommodating slot 91, the stopped portion 1b of the memory 100 is stopped by the stopping portion 93 and cannot be successfully embedded into the accommodating slot 91, such that one end of the memory 100 having the stopped portion 1b is lifted while the other end having the connector 131 enters the accommodating slot 91. At this point in time, the connector 131 cannot be docked with the docking connector 92 (as shown), or cannot be fully docked with the docking connector 92 (not shown). In this misplugged state, the connector 131 and the docking connector 92 cannot be coupled (as shown), or can at most be only partially coupled (meaning that the connection terminals of the two are not completely coupled, not shown). Regardless of whether not being coupled or being partially coupled, the device body 900 cannot read the memory 100, hence allowing the user to become aware that the assembly of the memory 100 and the device body 900 is in a misplugged state and further prompting the user to perform the assembly in a correct manner.

In conclusion, the detachable memory and the electronic device having the detachable memory of the present invention achieve the expected application objects, solve the issues of the prior art, and are novel and involve an inventive step, fully meeting the requirements of a patent application. Therefore, a patent application is filed accordingly, and granting the application with patent rights is respectfully requested to ensure rights of the inventor.

Preferred feasible embodiments of the present invention are described as above, and are not to be construed as limitations to the scope of protection of the present invention. Similarly, equivalent structural changes made according to the contents of the description and drawings of the present invention are to be encompassed within the scope of the present invention.

What is claimed is:

1. An electronic device having a detachable memory, the electronic device provided with a docking connector and comprising:
   a device body, having an accommodating slot and a stopping portion provided corresponding to the accommodating slot, the stopping portion and the accommodating slot jointly forming a displacement space in between, wherein the docking connector and the stopping portion are formed on opposite sides of the accommodating slot; and
   the memory, provided with a stopped portion and a connector;
   arranged such that the stopped portion is partially receivable in the displacement space with the memory in an inclined position relative to the accommodating slot such that the stopped portion is abutted against the stopping portion, and the memory is rotatable from the inclined position to a horizontal position with the stopping portion operating a fulcrum for the stopped portion as the stopped portion simultaneously slides relative to the stopping portion fully into the displacement space, wherein the memory is accommodated in the accommodating slot with the connector docked with the docking connector when in the horizontal position, the stopping portion projects over a portion of the accommodating slot, and the displacement space is formed between the stopping portion and a slot bottom surface of the accommodating slot, and the displacement space is overlapping with the stopping portion on a vertical projection plan of the slot bottom surface of the accommodating slot.

2. The electronic device having a detachable memory according to claim 1, wherein the stopped portion is provided with at least two guiding grooves, and the stopping portion is provided with at least two guiding ribs respectively corresponding to the at least two guiding grooves.

3. The electronic device having a detachable memory according to claim 1, wherein the accommodating slot is recessed from the device body, the slot bottom surface is formed at a recess ending point, and the stopping portion is located in front of the recess ending point of the accommodating slot and partially blocks the accommodating slot.

4. The electronic device having a detachable memory according to claim 1, wherein the memory comprises a memory body, the stopped portion and a fastener, the stopped portion protrudes from the memory body, the fastener protrudes from the stopped portion, and the stopped portion is connected between the memory body and the fastener.

5. The electronic device having a detachable memory according to claim 4, wherein a slot wall of the accommodating slot is provided with a fastening hole, arranged such the memory is accommodated in the accommodating slot in the horizontal position, and the fastener is received in the fastening hole.

6. The electronic device having a detachable memory according to claim 4, wherein the memory comprises a positioner at the memory body, and the accommodating slot comprises a positioning portion respectively corresponding to the positioner.

7. The electronic device having a detachable memory according to claim 4, wherein a length of the memory from the memory body to the fastener is greater than a length of the accommodating slot.

8. The electronic device having a detachable memory according to claim 1, wherein the stopped portion has a joining surface arranged to partially abut against a corresponding joining surface of the stopping portion when the stopped portion is partially received in the displacement space with the memory in the inclined position, to rotate and slide along relative to and the corresponding joining surface when the memory is rotated from the inclined position to the horizontal position, and to fully abut the corresponding joining surface when the stopping portion is fully received into the displacement space.

9. The electronic device having a detachable memory according to claim 8, wherein the joining surface and the corresponding joining surface are inclined relative to the slot bottom surface of the accommodating slot.

10. The electronic device having a detachable memory according to claim 1, wherein the device body comprises a retaining structure comprising a retainer, arranged such that when the memory is accommodated in the accommodating slot in the horizontal position, the retainer is movable into a position to retain the memory in the accommodating slot.

11. The electronic device having a detachable memory according to claim 10, wherein the memory comprises a retaining notch, arranged such that when the memory is accommodated in the accommodating slot in the horizontal position, the retainer is movable into the retaining notch to retain the memory in the accommodating slot, and movable out of the retaining notch to release the memory.

12. The electronic device having a detachable memory according to claim 1, wherein the device body has a first heat conductive carrier plate forming the accommodating slot, the memory comprises a second heat conductive carrier plate and a memory circuit board provided on the second heat conductive carrier plate, the second heat conductive carrier plate is adhered to the first heat conductive carrier plate, and one surface of the memory circuit board is adhered to the second heat conductive carrier plate to further transfer heat through the first heat conductive carrier plate to the device body.

13. The electronic device having a detachable memory according to claim 12, wherein the memory further comprises a cover, the cover and the second heat conductive carrier plate are joined to jointly form a box, and the memory circuit board is provided in the box and is provided with the connector exposed from the box.

14. The electronic device having a detachable memory according to claim 12, wherein one other surface of the memory circuit board is adhered with at least one anti-electrostatic discharge (ESD) adhesive.

* * * * *